(12) United States Patent
Anvin et al.

(10) Patent No.: US 7,451,300 B1
(45) Date of Patent: Nov. 11, 2008

(54) EXPLICIT CONTROL OF SPECULATION

(75) Inventors: H. Peter Anvin, San Jose, CA (US);
David Dunn, Sammamish, WA (US)

(73) Assignee: Transmeta Corporation, Santa Clara, CA (US)

( * ) Notice: Subject to any disclaimer, the term of this patent is extended or adjusted under 35 U.S.C. 154(b) by 458 days.

(21) Appl. No.: 10/620,862

(22) Filed: Jul. 15, 2003

(51) Int. Cl.
*G06F 15/00* (2006.01)
(52) U.S. Cl. ...................................... 712/244
(58) Field of Classification Search ................. 712/244, 712/227–229, 235
See application file for complete search history.

(56) References Cited

U.S. PATENT DOCUMENTS

| | | | | |
|---|---|---|---|---|
| 5,881,280 | A * | 3/1999 | Gupta et al. | 712/244 |
| 6,854,048 | B1 * | 2/2005 | Dice | 712/216 |
| 6,925,552 | B2 * | 8/2005 | Reilly et al. | 712/244 |
| 2002/0092002 | A1 * | 7/2002 | Babaian et al. | 717/137 |

OTHER PUBLICATIONS

"The Technology Behind Crusoe Processors"; Alexander Klaiber; Jan. 2000.*
"The Transmeta Code Morphing Software: Using Speculation, Recovery, and Adaptive Retranslation to Address Real-Life Challenges"; James Dehnert et al.; Mar. 2003; IEEE.*
"BOA: The Architecture of a Binary Translation Processor"; E. Altman et al.; Dec. 2000.*
"Checkpointe Repair for Out-of-order Execution Machines"; Wen-mei Hwu and Yale Patt; 1987; ACM.*
"Webster's II New College Dictionary"; 2001; Houghton Mifflin.*

* cited by examiner

*Primary Examiner*—Tonia L. M. Dollinger
*Assistant Examiner*—Benjamin Geib

(57) ABSTRACT

Described are methods and systems that allow partial speculation (e.g., speculation within constraints). With partial speculation, after a fault is detected for example, speculation remains enabled for processor registers and other memories private to a microprocessor, while speculation normally permitted for certain other operations is suspended. Accordingly, while the fault is dispatched, some speculation is permitted as opposed to suspending all speculation. As such, microcode that makes use of speculation can be written.

20 Claims, 3 Drawing Sheets

100

200

EXPLICIT CONTROL OF SPECULATION

BACKGROUND OF THE INVENTION

1. Field of the Invention

Embodiments of the present invention relate to processors and microprocessors. More specifically, embodiments of the present invention relate to speculative execution of operations.

2. Related Art

Speculative execution is known in the art of microprocessors. Should an event occur where speculation is not permitted, speculation is suspended while the event is handled. A fault provides one example of such an event.

When implementing a complex instruction set computer (CISC) instruction set, some operations require the execution of microcode of some sort. Generally, it is desirable for the microcode to have access to the speculation function. However, when speculation is suspended, this will not be the case.

SUMMARY OF THE INVENTION

Embodiments of the present invention provide methods and systems that allow partial speculation (e.g., speculation within constraints) in situations where speculation is not conventionally permitted.

BRIEF DESCRIPTION OF THE DRAWINGS

The accompanying drawings, which are incorporated in and form a part of this specification, illustrate embodiments of the invention and, together with the description, serve to explain the principles of these embodiments.

DETAILED DESCRIPTION OF THE INVENTION

Figure 1:
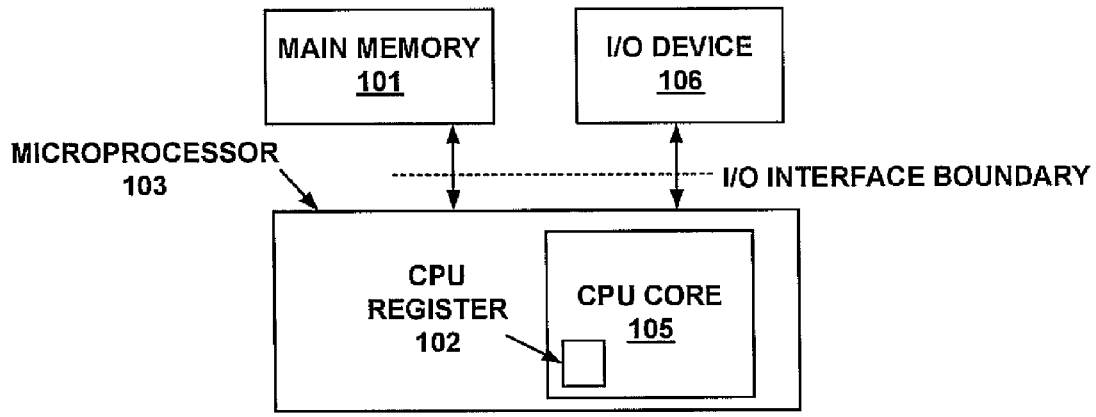
FIG. 1 is a block diagram of an example of a computer system architecture that can be used with embodiments of the present invention.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "operating," "exiting," "entering," "permitting," "suspending," "returning," "counting," "experiencing," "rolling back," "detecting," "handling" or the like, refer to the action and processes (e.g., flowcharts 400 and 500 of FIGS. 4 and 5, respectively) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention may be practiced on a computer system that includes, in general, a central processing unit (CPU) for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include a device for providing a physical communication link between the computer system and a network, using either a wired or a wireless communication interface.

FIG. 1 is a block diagram of an example of a computer system 100 that can be used with embodiments of the present invention. In the present embodiment, computer system 100 includes a microprocessor 103 coupled to main memory 101 and to an input/output (I/O) device 106. Main memory 101 functions as the primary workspace of a computer system and can include the operating system software and application software used by the computer system. I/O device 106 can be any of a variety of peripheral devices other than main memory.

Figure 2:
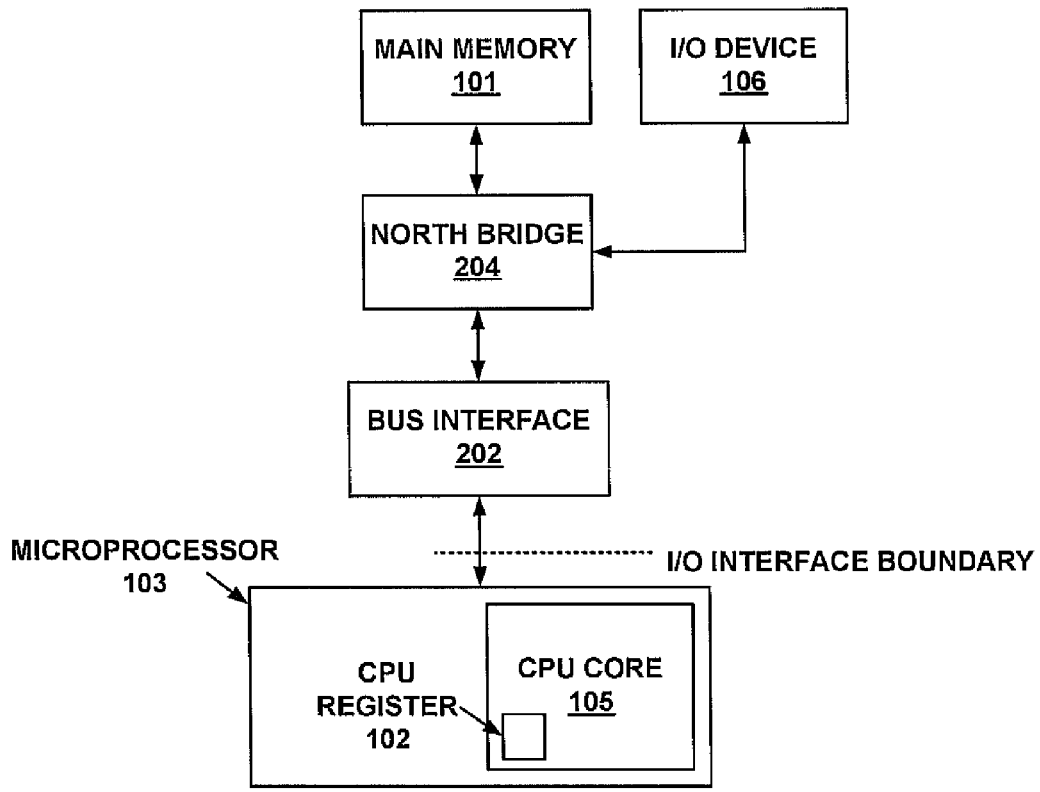
FIG. 2 is a block diagram of another example of a computer system architecture that can be used with embodiments of the present invention.

FIG. 2 is a block diagram of another example of a computer system 200 that can be used with embodiments of the present invention. Relative to the architecture of FIG. 1, computer system 200 introduces a bus interface 202 and a north bridge 204 between main memory 101, I/O device 106 and microprocessor 103.

Referring to both FIGS. 1 and 2, microprocessor 103 is generally described as a complex instruction set computer (CISC) microprocessor. Microprocessor 103 includes CPU core 105, which includes a CPU register 102. CPU register 102 represents an instance of microprocessor memory that can be referred to as "private memory." As used herein, private memory refers to memory that is not subject to direct memory access (DMA) and that is hidden from input/output (I/O) bus(es). Private memory also refers to memory that is not observable outside of the microprocessor 103, either physically or logically. There can also be instances of private memory other than or in addition to CPU register 102.

It is appreciated that computer systems 100 and 200 can include additional components as described above, and that there can be paths between components different from or in addition to the paths illustrated in FIGS. 1 and 2.

An I/O interface boundary is represented in FIGS. 1 and 2. The position of the I/O interface boundary can be different than that shown. The I/O interface boundary is used here as an abstraction, to illustrate that a memory operation that results in the I/O interface boundary being crossed is externally visible (relative to microprocessor 103) while a memory operation that does not result in the I/O interface boundary being crossed is not externally visible (relative to microprocessor 103).

For the purpose of explanation, the discussion herein refers to an "abstract machine." In this context, an abstract machine is a theoretical construct implementing the formal definition of an instruction set architecture (ISA) as visible to operating system and application software, for example a variant of the x86 (80×86) instruction set architecture.

In one embodiment, microprocessor 103 is an x86 processor (e.g., a microprocessor that implements the x86 ISA using a combination of hardware circuits and microcode). In another embodiment, microprocessor 103 is a processor that transfers to software those functions that are keyed to determining what instructions (micro-instructions) to execute and when. In one example of the latter embodiment, conventional x86 (80×86) instructions are converted into microarchitecture instructions, for example Very Long Instruction Word (VLIW) instructions using "Code Morphing™ software."

One implementation of Code Morphing™ software utilizes an interpreter module and a translator module. Among other functions, the interpreter module interprets ISA (e.g., x86) instructions one at a time, similar to that of conventional processors. The translator module is invoked when critical and/or frequently used ISA instruction sequences are detected. In general, the translator module recompiles the ISA instructions into native instructions that can reduce the number of instructions executed and that can schedule the instructions to execute more efficiently within the microprocessor.

As used herein, a "translation" refers to a microarchitecture instruction or sequence of microarchitecture instructions that perform the same function as some set of ISA-specified instructions. A translation can be viewed as having a beginning state and an ending state (the ending state is, in essence, the beginning state of the next translation). The beginning and ending states may be referred to as "commit points." At a commit point, the "architecturally visible" resources of the translating processor and of the abstract machine should be the same.

Embodiments of the present invention introduce methods and systems thereof that allow partial speculation (e.g., speculation within constraints). With partial speculation, after certain types of events are detected, speculation remains enabled for CPU registers and other memories private to a microprocessor, while speculation normally permitted for certain other operations is suspended. Accordingly, while the event is dispatched, some speculation is permitted as opposed to suspending all speculation.

Figure 3:
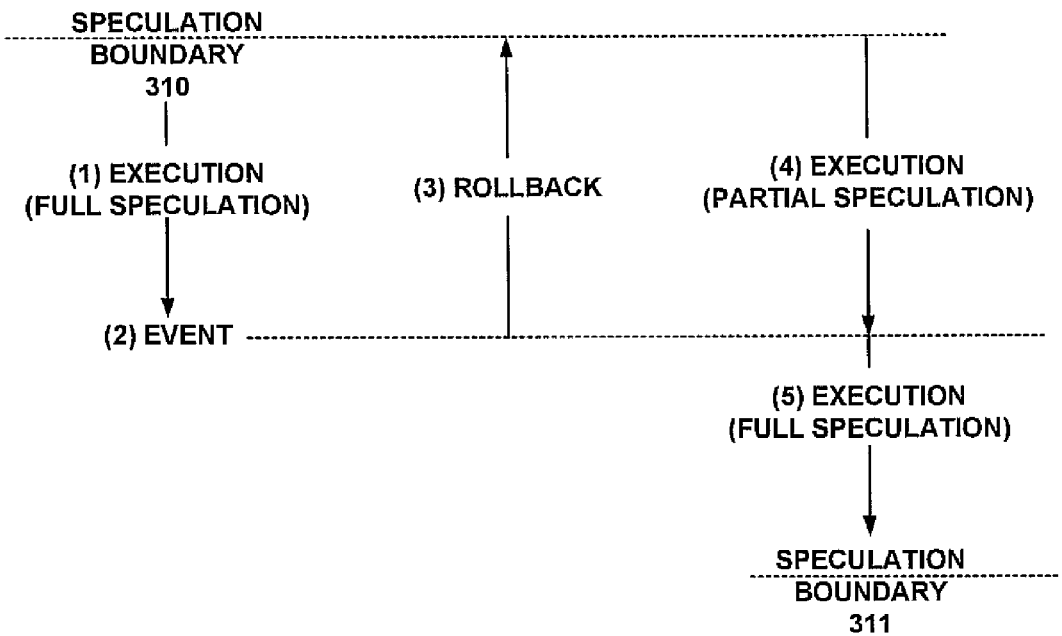
FIG. 3 illustrates the use of controlled (partial) speculation according to an embodiment of the present invention.

FIG. 3 illustrates the use of controlled (e.g., partial) speculation according to an embodiment of the present invention. Execution begins at a point identified as a "speculation boundary." A speculation boundary refers to a memory state of the microprocessor (e.g., microprocessor 103 of FIGS. 1 and 2) that is present at a particular point in time.

In the example of FIG. 3, in step 1, execution proceeds forward from the speculation boundary 310 in a first mode referred to as full speculation mode. Operations can be roughly categorized into three categories: register, memory, and I/O. In full speculation mode, register operations can be speculated as long as their original state can be recovered. Memory operations can be speculated, but in the event of a DMA request, speculation is constrained. Speculation of I/O operations is permitted in some instances and constrained in others.

Specifically, in one embodiment of full speculation mode, speculation is permitted for register operations, operations that involve memory that is private to the microprocessor 103 of FIGS. 1 and 2 (e.g., memory hidden from an I/O bus or memory protected against DMA), I/O writes but not I/O reads, and main memory reads and writes. Generally, speculation is not permitted in the event of a DMA request, although there may be exceptions. Also, speculation permits the presence of non-architectural faults (exceptional conditions that do not correspond to observable events in the abstract machine mentioned above).

In step 2 of FIG. 3, some type of event is identified. An event can be a fault such as an attempt to access a memory page that does not exist, or an attempt to access a segment descriptor that is not valid. An event can instead be a DMA request or an I/O read. In the presence of these kinds of events, full speculation mode may interfere with the externally visible behavior of microprocessor 103 (FIGS. 1 and 2), and so for some events such as those mentioned above, full speculation mode should be suppressed.

In step 3 of FIG. 3, roll back to the speculation boundary 310 occurs, restoring the memory state that existed at that point.

In step 4 of FIG. 3, execution proceeds forward from the speculation boundary 310 in a second mode referred to as partial speculation mode. In one particular implementation, the second mode is known as the XPROMOTE mode.

In partial speculation mode, speculation is permitted for a non-null subset of the operations permitted in full speculation mode. Specifically, in one embodiment of partial speculation mode, speculation is permitted for register operations and for operations that involve memory that is private to the microprocessor 103 of FIGS. 1 and 2 (e.g., memory hidden from an input/output bus or memory protected against DMA). In partial speculation mode, speculation is permitted, for example, for the benefit of correctly handling "architectural faults" (exceptional conditions that do correspond to observable events in the abstract machine mentioned above).

In an embodiment in which microprocessor 103 is a microprocessor that utilizes a translator module and an interpreter module as described above, interpretation of non-native instructions can be performed in full or partial speculation modes, while translations are executed in full speculation mode.

In one embodiment, a speculation boundary corresponds to a commit point. An example of microcode according to such an embodiment is illustrated by the following:

```
load_ss( );      [1. load stack segment]
load_cs( );      [2. load code segment]
cmit ( );        [3. speculation boundary]
load_ds( );      [4. load data segment]
cmit ( ).        [5. speculation boundary]
```

In the example above, it is assumed that the ISA definition is such that the final state after a failure to load the code segment at line 2 would contain the stack segment as it was prior to entering this microcode sequence, whereas after a failure to load the data segment on line 4 the final state would contain the stack and code segments loaded at lines 1 and 2. In this example, if the speculation system cannot be used, additional tests would need to be added to verify that the code segment load on line 2 would complete successfully before the stack segment load on line 1 is attempted.

Thus, in response to an event, partial speculation mode permits some speculative operations to be performed, in lieu of suspending all speculative operations in response to the event. Note that in some situations, all speculative operations may still be suspended. For example, should another event occur during operation in partial speculation mode, all speculative operations may be suspended. Thus, according to the embodiments of the present invention, at least three speculation modes are permitted: full speculation, partial speculation, and all speculation suspended.

It is appreciated that other types of full and partial speculation modes can be defined. That is, for example, a full speculation mode or a partial speculation mode can be defined that includes operations other than those mentioned herein. Similarly, different levels of partial speculation modes can be defined. For example, the highest level of partial speculation could permit operations that are a subset of the operations permitted with full speculation. The next level of partial speculation could be a different subset of the operations permitted with full speculation. Alternatively, the next level of partial speculation could be a smaller subset of the larger subset of operations associated with the highest level of partial speculation.

In step 5 of FIG. 3, execution in partial speculation mode continues until the event is handled or until some other condition is satisfied. For example, in step 1, a count can be made of the number of instructions executed in full speculation mode. When the same number of instructions are executed in step 4 in partial speculation mode, then a return to full speculation mode can be made.

Speculation boundary 311 corresponds to a memory state that exists during the execution of step 5. In one embodiment, speculation boundary 311 corresponds to another commit point, subsequent to the commit point associated with speculation boundary 310.

Figure 4:
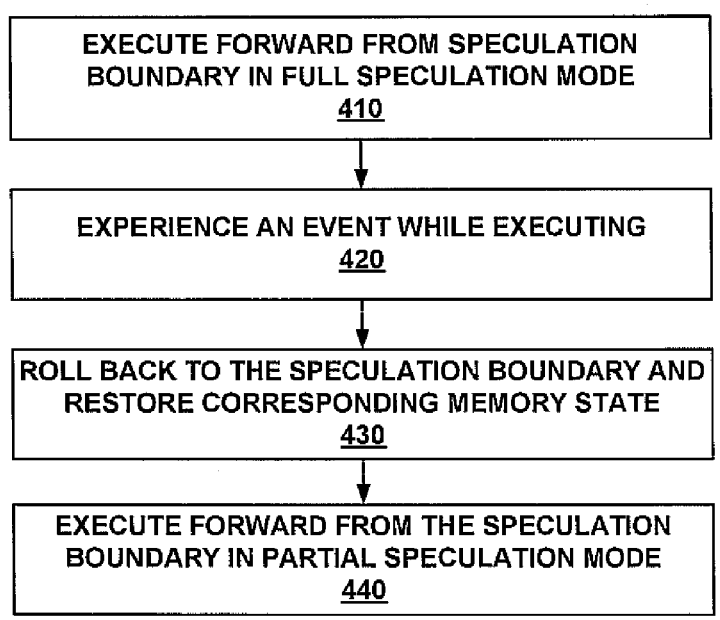
FIG. 4 is a flowchart of a method providing partial speculation according to an embodiment of the present invention.
Figure 5:
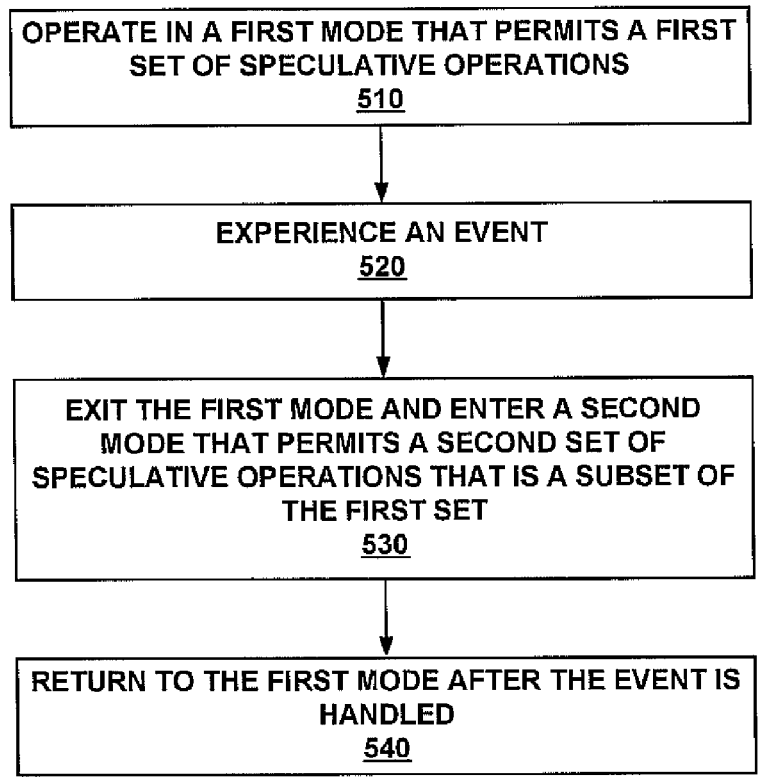
FIG. 5 is a flowchart of another method providing partial speculation according to an embodiment of the present invention.

FIG. 4 is a flowchart 400 of a method providing partial speculative operation according to an embodiment of the present invention. FIG. 5 is a flowchart 500 of another method providing partial speculative operation according to an embodiment of the present invention. Although specific steps are disclosed in flowcharts 400 and 500, such steps are exemplary. That is, embodiments of the present invention are well suited to performing various other steps or variations of the steps recited in flowcharts 400 and 500. It is appreciated that the steps in flowcharts 400 and 500 may be performed in an order different than presented, and that not all of the steps in flowcharts 400 and 500 may be performed.

Referring first to FIG. 4, in step 410, operations are executed in full speculation mode. Operations are executed forward from a speculation boundary (e.g., speculation boundary 310 of FIG. 3). The speculation boundary represents a state of the microprocessor (e.g., microprocessor 103 of FIGS. 1 and 2).

In step 420 of FIG. 4, an event (e.g., a fault, an I/O read, or a DMA request) is detected.

In step 430, the initial microprocessor state is restored by rolling back to the speculation boundary (e.g., speculation boundary 310 of FIG. 3).

In step 440 of FIG. 4, operations are executed from the speculation boundary in partial speculation mode. Once the event is handled, or once some other type of condition is satisfied, execution can return to full speculation mode. Alternatively, speculation may be suspended in entirety should another event occur during partial speculation mode.

Referring now to FIG. 5, in step 510, operations are executed while in a first mode of speculative operation (e.g., a full speculation mode) that permits a first set of speculative operations.

In step 520, an event is experienced. The event is of a type such that execution in the first mode of speculative operation is no longer permissible. Full speculation mode may interfere with the externally visible behavior of microprocessor 103 (FIGS. 1 and 2), and so full speculation mode is suppressed for some events such as DMA requests, I/O reads and faults.

In step 530 of FIG. 5, in response to the event, the first mode of operation is exited and a second mode of operation is entered. In the second mode (e.g., a partial speculation mode), a second set of speculative operations is permitted, the second set being a subset of the first set. The second set of speculative operations include those operations that are limited to memory that is private to the microprocessor (e.g., memory hidden from input/output buses or memory protected against DMA), such as CPU register 102 of FIGS. 1 and 2.

In step 540 of FIG. 5, after the event is handled (or after some other condition is satisfied), execution can return to the first mode of operation (e.g., to full speculation mode).

In summary, according to the various embodiments of the present invention, a partial speculation mode of operation is introduced. The partial speculation mode is in addition to a full speculation mode and a mode in which speculation is suspended in entirety. While in partial speculation mode, processor register operations can be speculated. Furthermore, in partial speculation mode, memory operations under exclusive control and use of a microprocessor can be speculated. As such, microcode can be written that makes use of the speculation system.

Embodiments of the present invention have been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system comprising a microprocessor, a method of providing partial speculative operation in lieu of suspending speculation, said method comprising:
   operating in a first mode of speculative operation, said first mode permitting speculation of a first set of speculative operations;
   experiencing an event during said operating;
   in response to said event, restoring a state of said microprocessor to a state committed to memory prior to said event;
   subsequent to said restoring, suspending a non-null first subset of said first set of speculative operations, wherein speculative operations in said first subset are not permitted during said suspending; and
   exiting said first mode and entering a second mode of speculative operation in response to said event, said second mode permitting speculation of a non-null second subset of said first set, wherein said first subset comprises input/output (I/O) writes, main memory reads, and main memory writes, wherein said first mode permits speculation for handling non-architectural faults, wherein said second subset comprises operations that involve memory that is private to said microprocessor, and wherein said second mode permits speculation for handling architectural faults.

2. The method of claim 1 wherein said second subset comprises speculative operations that are invisible external to said microprocessor.

3. The method of claim 1 wherein said event is selected from the group consisting of a fault, and a direct memory access request.

4. The method of claim 1 further comprising suspending speculative operation in response to a second event.

5. The method of claim 1 further comprising returning to said first mode after said event is handled.

6. The method of claim 1 further comprising:
   counting the number of instructions executed in said first mode prior to said event; and
   returning to said first mode upon executing the same number of instructions after entering said second mode.

7. The method of claim 1 wherein said microprocessor comprises a combination of translation software and host hardware, said translation software running directly on said host hardware, said translation software for interpreting and translating a sequence of non-native instructions into a sequence of native instructions, wherein said interpreting is permitted during said second mode.

8. A method providing partial speculative operation, said method comprising:
   executing forward from a speculation boundary representing a memory state of a microprocessor, said executing according to a full speculation mode that permits a set of speculative operations;
   experiencing an event during said executing;
   rolling back to said speculation boundary and restoring said memory state in response to said event;
   subsequent to said rolling back, suspending a non-null first subset of said set of speculative operations, wherein said first subset does not include all of said speculative operations and wherein speculative operations in said first subset are not permitted during said suspending; and
   subsequent to said suspending, executing forward from said speculation boundary according to a partial speculation mode that permits a non-null second subset of said set of speculative operations, wherein said partial speculation mode is used in lieu of suspending said set of speculative operations in entirety, wherein said first subset comprises input/output (I/O) writes, main memory reads, and main memory writes, wherein said full speculation mode permits handling non-architectural faults, wherein said second subset comprises operations that involve memory that is private to said microprocessor, and wherein said partial speculation mode permits handling architectural faults.

9. The method of claim 8 wherein said second subset of speculative operations comprises speculative memory operations that are invisible external to said microprocessor.

10. The method of claim 8 wherein said event is selected from the group consisting of a fault, and a direct memory access request.

11. The method of claim 8 further comprising:
    detecting a second event during operation in said partial speculation mode; and
    suspending speculative operation in response to said second event.

12. The method of claim 8 further comprising:
    handling said event; and
    returning to said full speculation mode after said event is handled.

13. The method of claim 8 further comprising:
    counting the number of instructions executed in said full speculation mode prior to said event;
    executing the same number of instructions after entering said partial speculation mode; and
    returning to said full speculation mode after executing said same number of instructions.

14. The method of claim 8 wherein said microprocessor comprises a combination of translation software and host hardware, said translation software running directly on said host hardware, said translation software for interpreting and translating a sequence of non-native instructions into a sequence of native instructions, wherein said interpreting is permitted during said partial speculation mode.

15. A computer system comprising:
    a main memory; and
    a microprocessor coupled to said main memory;
    wherein said computer system implements a first mode of speculative operation, a second mode of partial speculative operation, and a third mode in which said speculative operations are suspended in entirety, wherein operation in said first mode permits speculation of a set of speculative operations up to and beyond a commit point at which a state of said microprocessor is committed to memory and wherein operation in said second mode begins after a rollback operation that restores said state, and wherein in said second mode a non-null first subset of said set of speculative operations are suspended leaving enabled a non-null second subset of said set of speculative operations, wherein said first mode permits speculative operations comprising operations that involve memory that is private to said microprocessor, input/output (I/O) writes, main memory reads, and main memory writes, wherein said first mode permits speculation for non-architectural faults, wherein said second mode permits speculative operations comprising operations that is private to said microprocessor, and wherein said second mode permits speculation for handling architectural faults.

16. The computer system of claim 15 wherein said second mode permits speculative operations that are invisible external to said microprocessor.

17. The computer system of claim 15 wherein a transition from said first mode to said second mode occurs in response to an event that is selected from the group consisting of a fault, and a direct memory access request.

18. The computer system of claim 17 wherein a transition back to said first mode occurs after said event is handled.

19. The computer system of claim 17 wherein the number of instructions executed in said first mode prior to said event are counted, wherein a transition back to said first mode occurs after the same number instructions are executed in said second mode.

20. The computer system of claim 15 wherein said microprocessor is a microprocessor comprising a combination of translation software and host hardware, said translation software running directly on said host hardware, said translation software for interpreting and translating a sequence of non-native instructions into a sequence of native instructions, wherein said interpreting is permitted during said second mode.

* * * * *